(12) United States Patent
Casas-Sanchez et al.

(10) Patent No.: US 9,338,146 B2
(45) Date of Patent: May 10, 2016

(54) METHOD AND APPARATUS FOR MONITORING TRANSMISSION CHARACTERISTICS IN A NETWORK

(71) Applicants: Miguel Casas-Sanchez, Antwerp (BE); Jan Van Winkel, Antwerp (BE)

(72) Inventors: Miguel Casas-Sanchez, Antwerp (BE); Jan Van Winkel, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 30 days.

(21) Appl. No.: 14/358,557

(22) PCT Filed: Dec. 6, 2012

(86) PCT No.: PCT/EP2012/074611
§ 371 (c)(1),
(2) Date: May 15, 2014

(87) PCT Pub. No.: WO2013/087495
PCT Pub. Date: Jun. 20, 2013

(65) Prior Publication Data
US 2014/0331048 A1 Nov. 6, 2014

(30) Foreign Application Priority Data
Dec. 16, 2011 (EP) .................................... 11306687

(51) Int. Cl.
*H04L 9/00* (2006.01)
*H04L 29/06* (2006.01)
*H04L 12/26* (2006.01)

(52) U.S. Cl.
CPC .......... *H04L 63/0428* (2013.01); *H04L 43/087* (2013.01); *H04L 43/0858* (2013.01); *H04L 43/10* (2013.01); *H04L 43/16* (2013.01)

(58) Field of Classification Search
CPC . H04L 63/04; H04L 63/1425; H04L 63/1433; H04L 63/1441; H04L 63/20; H04L 63/16; H04L 9/3294; H04L 9/3297; H04L 41/0213; G06F 21/60; G06F 21/606
USPC ........ 726/11, 22–26; 713/150, 168–170, 178; 709/223–225
See application file for complete search history.

(56) References Cited

U.S. PATENT DOCUMENTS

| 7,065,579 B2 * | 6/2006 | Traversat | G06F 9/4416 709/225 |
| 7,275,102 B2 * | 9/2007 | Yeager | G06F 9/544 709/205 |

(Continued)

OTHER PUBLICATIONS

International Search Report PCT/ISA/210 for International Application No. PCT/EP2012/074611 Dated on Dec. 6, 2012.

(Continued)

*Primary Examiner* — Hosuk Song
(74) *Attorney, Agent, or Firm* — Harness, Dickey & Pierce, P.L.C.

(57) ABSTRACT

A method for monitoring transmission characteristics in a network including a media client, a media server, and a data processor, the method including establishing a connection with the data processor; establishing an end-to-end encrypted channel between the media client and the data processor for exchanging streaming media content over the connection; sending a probing message to the data processor over the channel, the probing message carrying a first timestamp indicating the sending time of the probing message; receiving a response to all of the probing message from the data processor, the response carrying a second timestamp indicating the arrival time of the probing message at the data processor; and deriving latency information, including an upstream latency between the media client and the data processor, from a difference between the second timestamp and the first timestamp.

15 Claims, 2 Drawing Sheets

(56) References Cited

U.S. PATENT DOCUMENTS

| | | | | |
|---|---|---|---|---|
| 7,363,361 B2* | 4/2008 | Tewari | ................... | H04L 12/14 709/223 |
| 7,533,161 B2* | 5/2009 | Hugly | .................... | H04L 63/02 709/220 |
| 8,582,567 B2* | 11/2013 | Kurapati | ........... | H04L 29/06027 370/352 |
| 2003/0105604 A1 | 6/2003 | Ash et al. | | |
| 2009/0323926 A1 | 12/2009 | Shaham et al. | | |
| 2010/0002685 A1 | 1/2010 | Shaham et al. | | |

OTHER PUBLICATIONS

International Written Opinion PCT/ISA/237 for International Application No. PCT/EP2012/074611 Dated on Dec. 6, 2012.

* cited by examiner

METHOD AND APPARATUS FOR MONITORING TRANSMISSION CHARACTERISTICS IN A NETWORK

This application is the national phase under 35 U.S.C. §371 of PCT International Application No. PCT/EP2012/074611 which has an International filing date of Dec. 6, 2012, which claims priority to European patent application number EP 11306687.2 filed Dec. 16, 2011; the entire contents of each of which are hereby incorporated by reference.

FIELD OF THE INVENTION

The present invention relates to streaming media networks, and in particular to monitoring transmission characteristics in such networks.

BACKGROUND

The architecture used by streaming protocols such as RTMP requires a media server to interact with the media client. Any media processing cloud (hereinafter generically referred to as "data processor") thus needs to be connected to a number of these servers. In an interactive application with several users, one or many of these media servers can be used, for streaming from the clients to the data processor and back. The whole set of networks providing data transport between the media client and the data processor will hereinafter be referred to as the "transport network".

Presently, no satisfactory mechanisms exist to characterize the full transport network that is being used for multimedia streaming, in terms of bandwidth, delay, burstiness, packet loss probability etc. These parameters affect the quality experienced by the end user.

SUMMARY

According to an aspect of the invention, there is provided a method for monitoring transmission characteristics in a network comprising a media client, a media server, and a data processor, the method comprising the following steps at the media client: establishing a connection with the data processor, the connection comprising a first connection segment between the media client and the media server and a second connection segment between the media server and the data processor; establishing an end-to-end encrypted channel between the media client and the data processor for exchanging streaming media content, the end-to-end encrypted channel being carried by the connection; sending a probing message to the data processor over the end-to-end encrypted channel, the probing message carrying a first timestamp indicative of a sending time of the probing message; receiving a response to the probing message from the data processor, the response carrying a second timestamp indicative of an arrival time of the probing message at the data processor; and deriving latency information, wherein the latency information comprises an upstream latency characteristic of the connection between the media client and the data processor, calculated from a difference between the second timestamp and the first timestamp.

Embodiments of the present invention are based on the insight of the inventors that in streaming protocols such as RTMP, message types normally used for monitoring or management purposes may never reach the streaming server or the data processor due to the presence of firewalls, gateways, proxies, and the like. Embodiments of the present invention are further based on the insight that end-to-end tunneling between the media client and the data processor, which is used for certain dedicated tasks such as invoking remote procedure calls, may advantageously be used for monitoring of the transmission channel characteristics.

Embodiments of the invention further present the advantage of being able to determine latency values for the entire upstream path between the media client and the data processor.

Embodiments of the invention further present the advantage of performing latency measurements on the same channel that is actually used for content transfer, and not on a different (out-of-band management) channel.

In an embodiment of the method according to the present invention, the response further carries a third timestamp indicative of a sending time of the response, and the method further comprises determining a fourth timestamp indicative of a time of arrival of the response; wherein the latency information further comprises a downstream latency characteristic of the connection between the data processor and the media client, calculated from a difference between the fourth timestamp and the third timestamp.

This embodiment of the invention further presents the advantage of being able to determine latency values for the entire downstream path between the data processor and the media client.

In an embodiment of the method according to the present invention, the second timestamp and the third timestamp are expressed in the response as a single value.

This embodiment is based on the insight that, when the response is known to have been sent by the data processor substantially immediately after receipt of the probing message, a single timestamp suffices for determining the latency for both the upstream and the downstream path.

In an embodiment, the method according to the present invention further comprises repeating the sending of the probing message, the receiving of the response, and the deriving of latency information at regular intervals; and deriving jitter information from the repeatedly derived latency information.

This embodiment has the advantage of providing jitter information derived from the collected latency information.

In an embodiment of the method according to the present invention, the jitter information comprises a coefficient of variance.

In an embodiment, the method according to the present invention further comprises sending a request to the media server to modify a stream characteristic when the jitter information is indicative of jitter exceeding a predetermined level.

This embodiment is based on the insight of the inventors that jitter is a parameter that greatly affects the quality of experience for a streaming media service. Accordingly, this embodiment provides the advantage of adapting streaming parameters when the jitter reaches a level that is expected to negatively affect the end users' experience.

In an embodiment of the method according to the present invention, the stream characteristic to be modified comprises one of a frame rate, an image resolution, and a compression ratio.

In an embodiment of the method according to the present invention, the exchanging of streaming media content takes place by means of an RTMP protocol.

According to an aspect of the invention, there is provided a computer program configured to cause a processor to execute a method as described above.

According to an aspect of the invention, there is provided an apparatus for receiving a media stream over a network, the apparatus comprising: a protocol engine configured to establish a connection with a data processor, the connection comprising a first connection segment between the apparatus and a media server and a second connection segment between the media server and the data processor; an encryption agent configured to establish an end-to-end encrypted channel between the apparatus and the data processor for exchanging streaming media content, the end-to-end encrypted channel being carried by the connection; a clock; a probing agent, operatively coupled to the clock and the encryption agent, the probing agent being configured to send a probing message to the data processor over the end-to-end encrypted channel, the probing message carrying a first timestamp indicative of a sending time of the message, and to receive a response to the probing message from the data processor, the response carrying a second timestamp indicative of an arrival time of the probing message at the data processor; and a latency derivation agent, operatively coupled to the probing agent, the latency derivation agent being configured to calculate an upstream latency characteristic of the connection between the media client and the data processor from a difference between the second timestamp and the first timestamp.

In an embodiment of the apparatus according to the present invention, the response carries a third timestamp indicative of a sending time of the response by the data processor, and the latency derivation agent is further configured to determine a fourth timestamp indicative of receiving time of the response and to calculate a downstream latency characteristic of the connection between the data processor and the media client from a difference between the fourth timestamp and the third timestamp.

In an embodiment of the apparatus according to the present invention, the second timestamp and the third timestamp are expressed in the response as a single value.

In an embodiment of the apparatus according to the present invention, the latency derivation agent is further configured to derive jitter information from repeatedly derived latency information.

In an embodiment of the apparatus according to the present invention, the jitter information comprises a coefficient of variance.

In an embodiment of the apparatus according to the present invention, the protocol engine is further configured to transmit a request to the media server to modify a stream characteristic when the jitter information is indicative of jitter exceeding a predetermined level.

The advantages of the program and apparatus according to embodiments of the present invention correspond, mutatis mutandis, to the advantages expressed above for the corresponding methods according to embodiments of the present invention.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

Figure 1:
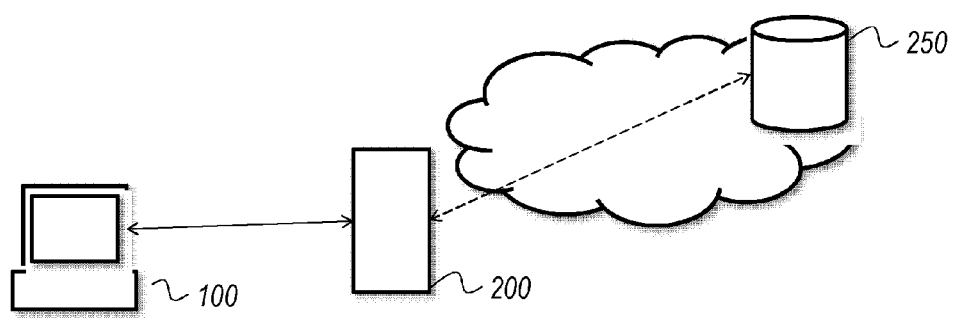
FIG. 1 presents an overview of an exemplary network in which the present invention can be deployed.

FIG. 1 illustrates an exemplary network in which the present invention can be deployed. The figure includes an apparatus 100, acting as a media client, and connected over a first network segment to a media server 200, which acts as a front-end for a service provider 250, terminating the relevant protocol messages towards the media client 100 and towards the data processor 250. The term "data processor" as used herein refers to the hardware infrastructure used for storing and streaming content, which may consist of one or more servers. This infrastructure may be distributed "in the cloud". Without loss of generality, only one media client 100 and one media server 200 are illustrated in FIG. 1.

Throughout the present application, transmission in the direction from the media client 100 to the media server 200 or the data processor 250 will be referred to as "upstream" communication. Transmission in the direction from the media server 200 or the data processor 250 to the media client 100 will be referred to as "downstream" communication.

The connection between the media client 100 and the data processor 250 comprises a first segment (between the apparatus 100 and a media server 200) and a second segment (between the media server 200 and the data processor 250). Each segment may in fact consist of several physical links, interconnected by bridges and/or routers, which are not relevant for the present invention.

The RTMP protocol defines certain control messages to be interchanged between client and server ("Ping" messages), that can be used to infer the status of the upstream or downstream link. This message interchange is not satisfactory for characterizing the transport network, because the messages are not fully described in the RTMP standard and because they only cover the first segment.

Furthermore, the first segment may comprise network elements such as firewalls, proxies, and gateways, which restrict certain kinds of traffic, including control or monitoring traffic, between the media client 100 and the media server 200.

Restrictions of this type are advantageously overcome by embodiments of the present invention, by using end-to-end encrypted communications between the media client 100 and the data processor 250 as explained in more detail below.

Figure 2:
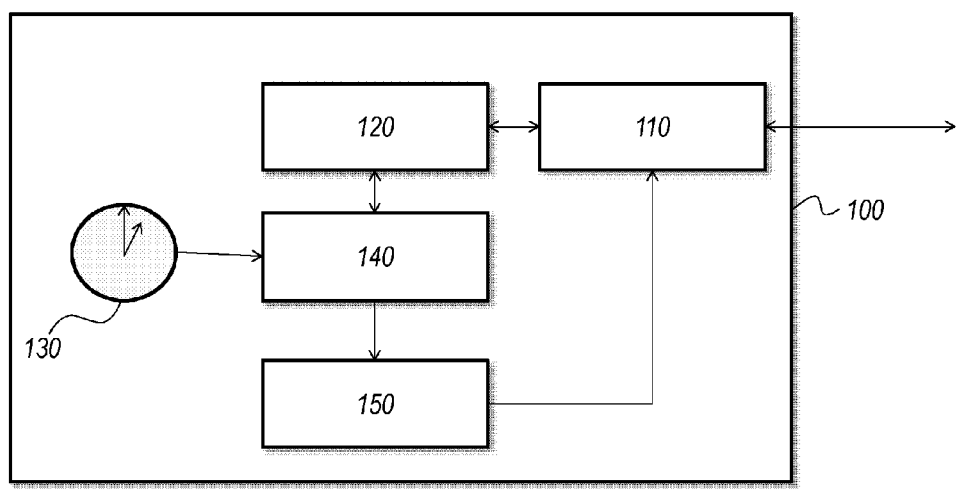
FIG. 2 presents a block diagram of an apparatus according to an embodiment of the present invention.

An apparatus 100 according to an embodiment of the present invention will now be described in more detail with reference to the block diagram shown in FIG. 2. The apparatus 100 is generally suited for receiving a media stream over a network, and will hereinafter be referred to as media client 100. Known examples of such media clients include computing devices equipped with an Adobe® Flash® player or a Microsoft® Silverlight® player.

The media client 100 comprises a protocol engine 110 configured to establish 310 a connection with a data processor 250. The protocol engine 110 includes the necessary hardware and software to provide a network connection, from the physical layer up to the protocol that is responsible for carrying out the content streaming. At the lowest layers, the protocol engine 110 typically includes a physical layer interface according to a standard for wired communication (e.g., IEEE 802.3, xDSL, GPON, . . . ) or wireless (mobile or non-mobile) communication (e.g. IEEE 802.11, IEEE 802.15, IEEE 802.16, 3G), with corresponding data link logic. The network layer is preferably governed by the Internet Protocol (IP). The transport layer is preferably governed by the Transport Control Protocol (TCP) and/or User Datagram Protocol (UDP). The streaming protocol is preferably Real-Time Messaging Protocol (RTMP), as defined in the RTMP Specification released by Adobe (http://www.adobe.com/devnet/rtmp/). Details of these protocols and the implementation of the appropriate hardware and software are known to the person skilled in the art.

The media client 100 further comprises an encryption agent 120 configured to establish 320 an end-to-end encrypted channel over the connection between the media client 100 and the data processor 250, for exchanging streaming media content. The encrypted channel may be established using the RTMPS protocol, which consists of RTMP over a secure SSL connection using HTTPS.

The media client 100 further comprises a clock 130, which produces timestamps with sufficient accuracy to obtain useful information about the latency of messages travelling over the network. A probing agent 140, operatively coupled to the clock 130 and the encryption agent 110, is configured to send 330 probing messages to the data processor 250 over the end-to-end encrypted channel. The probing message carries a first timestamp, generated by the clock 130, indicative of the time at which the message was sent. The probing agent 140 is further configured to receive a response to the probing message from the data processor 250. The response carries a second timestamp, which is used to make latency determinations.

The second timestamp, generated by the data processor 250 in accordance with embodiments of the present invention, is indicative of the arrival time of the probing message at the data processor 250. A latency derivation agent 150, operatively coupled to the probing agent 140, is configured to calculate 350 an upstream latency characteristic of the connection between the media client and the data processor from a difference between the second timestamp and the first timestamp.

If the response is transmitted back to the media client 100 immediately after being received by the data processor 250, the second timestamp is de facto also indicative of the sending time of the response. If this is not the case, a separate third timestamp may be provided pertaining to the sending time of the response. The latency derivation agent 150 may be further configured to calculate 350 a downstream latency characteristic of the connection between the data processor 250 and the media client 100 from a difference between the arrival time of the response and the second timestamp (or the separately provided third timestamp pertaining to the sending of the response).

Figure 3:
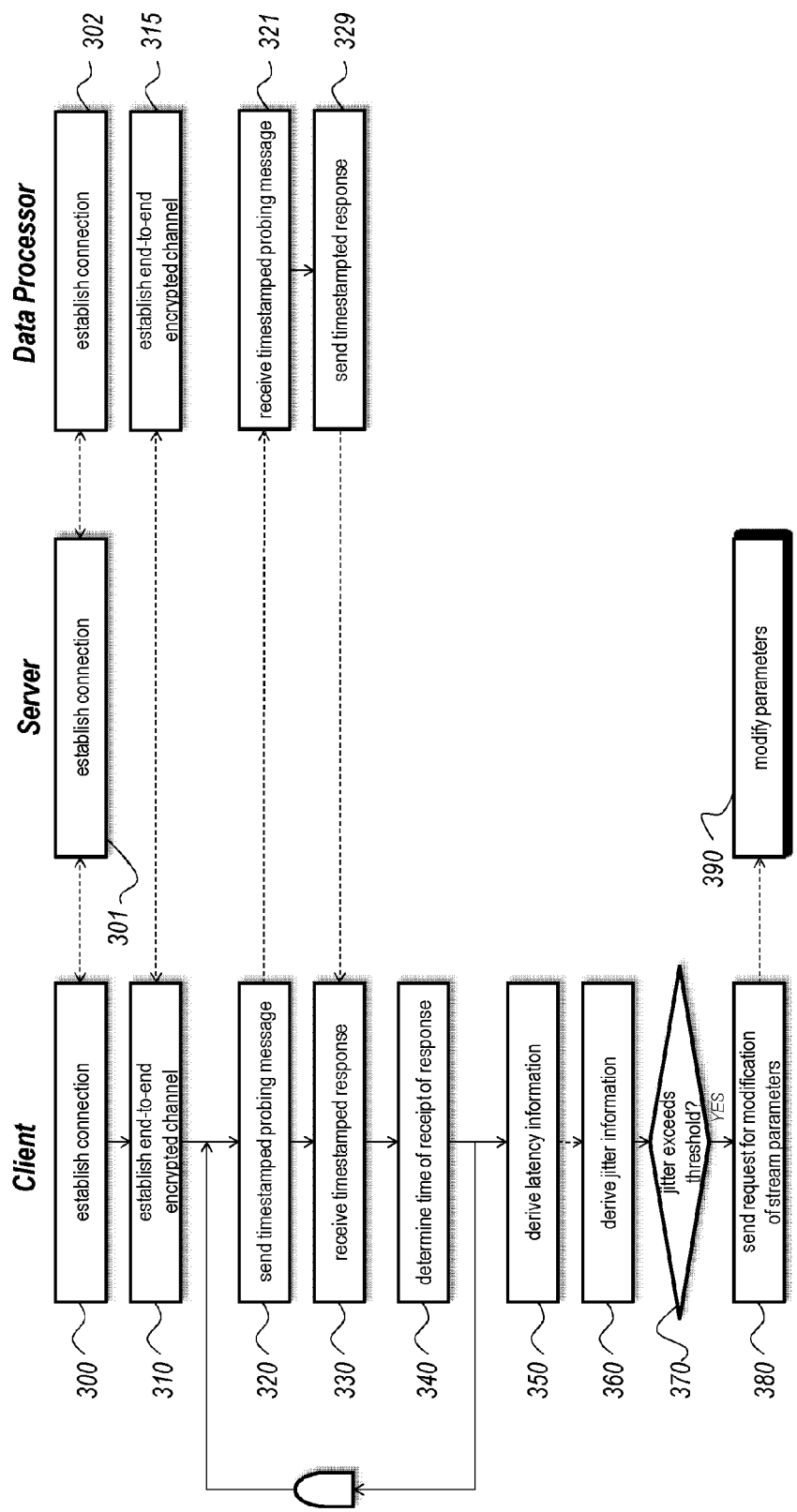
FIG. 3 provides a flow chart of a method according to an embodiment of the present invention.

A method according to an embodiment of the invention will now be described with reference to the flow chart shown in FIG. 3. The method is applied in a network as exemplified in FIG. 1, comprising a media client 100, a media server 200, and a data processor 250. FIG. 3 comprises three columns, indicating the actions of the respective entities that participate in the method. Unless otherwise indicated, actions will be described hereinafter from the point of view of the media client 100.

In a first step, a connection is established between the media client 100 and the data processor 250. The connection comprises a first segment between the media client 100 and the media server 200 and a second connection segment between the media server 200 and the data processor 250.

Accordingly, the establishment of the connection requires an action 300 at the client 100, an action 301 at the server 200, and an action 302 at the data processor 250. The connection may be established according to the RTMP protocol.

Once the connection is established, an end-to-end encrypted channel (or a bi-directional security association) is set up between the client 100 and the data processor 250. Although this channel is physically supported by both segments of the aforementioned connection, the server 200 does not participate in the client-data processor interaction.

Setting up the channel requires an action 310 at the client 100 and an action 315 at the data processor 250. The encrypted channel may be set up according to the RTMPS protocol.

Content may now be streamed between the data processor 250 and the client 100, unidirectionally or bidirectionally, over the established channel.

In order to monitor the characteristics of the path between the data processor 250 and the client 100, the media client 100 according to embodiments of the present invention sends 320 a probing message to the data processor 250 over the end-to-end encrypted channel. Unlike traditional "ping" messages, this probing message carries a timestamp, and it is sent over the end-to-end channel (i.e., it is transparently forwarded by nodes operating on lower layers). The first timestamp is substantially indicative of the time at which the probing message was sent. The message is received 321 by the data processor 250, which thus already obtains some information about the latency governing transmissions on the upstream path from the media client 100 to the data processor 250. The latency may be determined by calculating the difference between the time at which the probing message was sent (first timestamp) and the time at which it was received. The data processor 250 replies to the probing message by sending 329 a response message containing a second timestamp, which is substantially indicative of the time at which the probing message was received, and optionally also of the time at which the response message was sent. If the sending of the response 329 does not immediately follow the receiving of the probing message 321, a separate third timestamp may be provided in the response pertaining to the transmission of the response.

When the media client 100 receives 330 a response to the probing message from the data processor 250, the former obtains some information about the latency governing transmissions on the upstream path from the media client 100 to the data processor 250, which may be determined by calculating the difference between the second timestamp pertaining to the arrival 321 of the probing frame at the data processor 250 and the first timestamp. The media client 100 may optionally also derive information on the latency governing transmissions on the downstream path from the data processor 250 to the media client 100, by calculating the difference between the time at which the response was received 330 at the media client 100 (that moment may be considered as a "fourth timestamp", determined at the media client 100 in step 340) and the third timestamp pertaining to the departure 329 of the response from the data processor 250 (note again that the "third timestamp" may be a virtual timestamp coinciding in fact with the "second timestamp").

By combining the latency values of the upstream and downstream paths, a round-trip latency can be determined.

Steps 320-340 may be repeated, preferably at regular intervals, for example 25 times per second (mimicking the frame rate of a video stream, to determine the channel characteristics experienced by such a stream), to determine jitter values 360 for the upstream path, the downstream path, or the round-trip path. Jitter values for the upstream path may be determined in the same manner at the data processor 250.

Preferably, the jitter value is calculated as a coefficient of variance (CV), i.e. a standard deviation of the latency normalized to the average value, according to known methods. The CV provides an intuitive measure of the quality (in terms of jitter) of a transmission channel.

If the jitter exceeds a predetermined level, e.g. if the CV exceeds unity, the channel is considered highly affected by jitter. An assessment 370 of the jitter with respect to a predetermined threshold is preferably carried out, and used to trigger particular actions to improve the quality of the content streaming process. These actions preferably comprise transmitting a request 380 to the media server 200 to modify certain streaming parameters. Parameters to be modified may advantageously include frame rate, image resolution, and compression ratio. Even a choice for another codec, or the same coded with different operational parameters, could be requested in these cases.

Although certain features and advantages have only been described with respect to the apparatus according to embodiments of the present invention or with respect to the methods according to embodiments of the present invention, this is done for reasons of conciseness, and it will be understood that the features are interchangeable between the methods and the corresponding apparatus to obtain the same advantages.

The functions of the various elements shown in the Figures, including any functional blocks labeled as "processors", "agents", or "engines", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for monitoring transmission characteristics in a network comprising a media client, a media server, and a data processor, the method comprising at said media client:
    establishing a connection with said data processor, said connection including a first connection segment between said media client and said media server and a second connection segment between said media server and said data processor;
    establishing an end-to-end encrypted channel between said media client and said data processor for exchanging streaming media content, said end-to-end encrypted channel being carried by said connection;
    sending a probing message to said data processor over said end-to-end encrypted channel, said probing message carrying a first timestamp indicative of a sending time of said probing message;
    receiving a response to said probing message from said data processor, said response carrying a second timestamp indicative of an arrival time of said probing message at said data processor; and
    deriving latency information, said latency information including an upstream latency characteristic of said connection between said media client and said data processor, calculated from a difference between said second timestamp and said first timestamp.

2. The method according to claim 1, wherein
    said response further carries a third timestamp indicative of a sending time of said response,
    said method further comprises determining a fourth timestamp indicative of a time of arrival of said response, and
    said latency information further includes a downstream latency characteristic of said connection between said data processor and said media client, calculated from a difference between said fourth timestamp and said third time stamp.

3. The method according to claim 2, wherein said second timestamp and said third timestamp are expressed in said response as a single value.

4. The method according to claim 1, further comprising:
    repeating said sending of said probing message, said receiving of said response, and said deriving of latency information at regular intervals; and
    deriving jitter information from said repeatedly derived latency information.

5. The method according to claim 4, wherein said jitter information comprises a coefficient of variance.

6. The method according to claim 4, further comprising:
    sending a request to said media server to modify a stream characteristic when said jitter information is indicative of jitter exceeding a level.

7. The method according to claim 6, wherein said stream characteristic to be modified comprises one of a frame rate, an image resolution, and a compression ratio.

8. The method according to claim 1, wherein said exchanging of streaming media content is performed using an Real Time Messaging Protocol (RTMP).

9. A non-transitory computer readable medium comprising computer readable instructions, which when executed by a processor, cause the processor to execute the method of claim 1.

10. An apparatus for receiving a media stream over a network, the apparatus comprising:
    a protocol engine configured to establish a connection with a data processor, said connection including a first connection segment between said apparatus and a media server and a second connection segment between said media server and said data processor;
    an encryption agent configured to establish an end-to-end encrypted channel between said apparatus and said data processor for exchanging streaming media content, said end-to-end encrypted channel being carried by said connection;

a clock;

a probing agent, operatively coupled to said clock and said encryption agent, said probing agent being configured to, send a probing message to said data processor over said end-to-end encrypted channel, said probing message carrying a first timestamp indicative of a sending time of said message, and receive a response to said probing message from said data processor, said response carrying a second timestamp indicative of an arrival time of said probing message at said data processor; and a latency derivation agent, operatively coupled to said probing agent, said latency derivation agent being configured to calculate an upstream latency characteristic of said connection between said media client and said data processor from a difference between said second timestamp and said first timestamp.

11. The apparatus according to claim 10, wherein
said response carries a third timestamp indicative of a sending time of said response by said data processor, said latency derivation agent is further configured to, determine a fourth timestamp indicative of receiving time of said response, and calculate a downstream latency characteristic of said connection between said data processor and said media client from a difference between said fourth timestamp and said third timestamp.

12. The apparatus according to claim 11, wherein said second timestamp and said third timestamp are expressed in said response as a single value.

13. The apparatus according to claim 10, wherein said latency derivation agent is further configured to derive jitter information from repeatedly derived latency information.

14. The apparatus according to claim 13, wherein said jitter information comprises a coefficient of variance.

15. The apparatus according to claim 13, wherein said protocol engine is further configured to transmit a request to said media server to modify a stream characteristic when said jitter information is indicative of jitter exceeding a level.

* * * * *